Dec. 28, 1926.  
W. E. HOLLAND  
1,612,582  
RADIOBATTERY  
Filed August 15, 1922   2 Sheets-Sheet 1
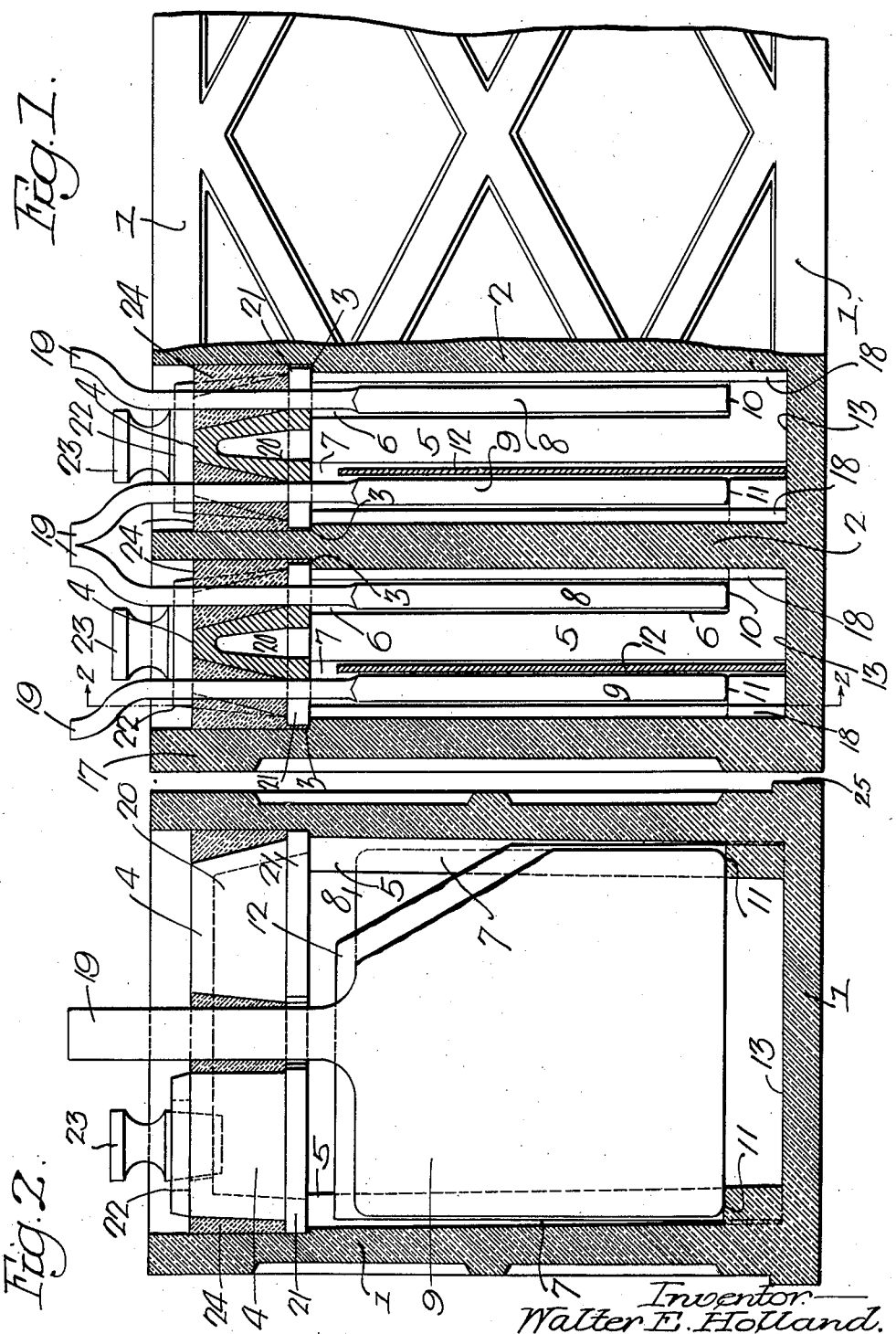
Inventor  
Walter E. Holland.  
by his Attorneys  
Howson & Howson Dec. 28, 1926.
W. E. HOLLAND
1,612,582
RADIOBATTERY
Filed August 15, 1922    2 Sheets-Sheet 2
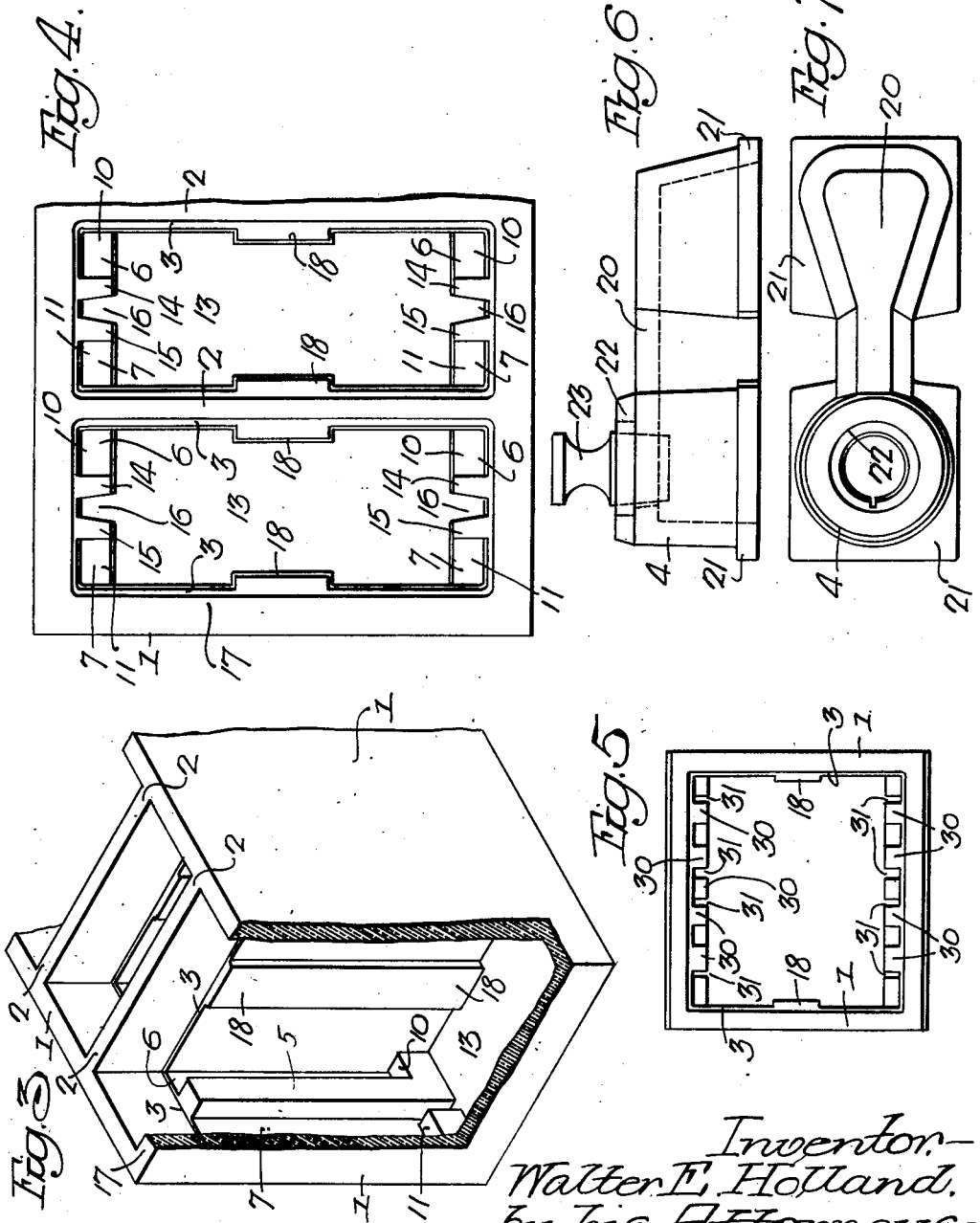
Inventor-
Walter E. Holland.
by his Attorneys-
Howson & Howson Patented Dec. 28, 1926.

1,612,582

UNITED STATES PATENT OFFICE.

WALTER E. HOLLAND, OF PHILADELPHIA, PENNSYLVANIA. ASSIGNOR TO PHILADELPHIA STORAGE BATTERY COMPANY, OF PHILADELPHIA, PENNSYLVANIA, A CORPORATION OF PENNSYLVANIA.

RADIOBATTERY.

Application filed August 15, 1922. Serial No. 581,971.

One object of this invention is to provide a form of battery involving a novel construction for supporting and spacing its plates, together with a novel form of cover and supporting means therefor especially designed to permit of a single body of sealing compound being utilized to make a tight joint around the plate lugs as well as between the cover and the container proper.

Another object of the invention is to provide a simple, substantial, inexpensive and compact form of battery particularly adapted for use, as the "B" battery of a radio receiving set, the construction being such as will minimize current leakage across the top of a battery as well as between adjacent cells.

I also desire to provide a battery cell including novel means for positively positioning its plates both with respect to each other and also the cell walls, with a view to insuring free access to said plates of electrolyte in relatively large quantities while reducing to a minimum the possibility of short circuiting of adjacent plates by aggregations of active material.

My invention further contemplates a novel form of battery container and cover therefor.

These objects and other advantageous ends I attain as hereinafter set forth, reference being had to the accompanying drawings, in which—

Fig. 1 is a fragmentary side elevation, partly in longitudinal vertical section, illustrating a battery constructed in accordance with my invention;

Fig. 2 is a transverse vertical section on the line 2—2, Fig. 1;

Fig. 3 is a perspective view of the container forming part of my battery, having portions of its side and end walls broken away to illustrate its interior construction;

Fig. 4 is a fragmentary plan of a slightly modified form of battery container;

Fig. 5 is a plan of a container for a multiple-plate battery cell constructed in accordance with my invention; and Figs. 6 and 7 are respectively a side elevation and a plan of the cover for one of the cell compartments of the container shown in Fig. 3.

In the above drawings 1 represents an elongated container preferably rectangular in section and divided by a series of vertical partitions 2 into a number of relatively narrow parallel compartments or cells. The container itself is preferably made of some material such as hard rubber which is an electrical insulator and is impervious to the electrolyte of a battery.

In accordance with my invention, each of the compartments has its walls sufficiently thickened or otherwise formed at some point below its top edge to form a shoulder 3 on the inner surface of each of its four side walls, primarily designed to support a cover or closure member 4, preferably having the construction shown in detail in Figs. 6 and 7. In addition, each of the end walls of each compartment has a vertically-extending rib 5 running from the level of the shoulder 3 down to the bottom of the compartment, whereby there are formed two parallel guideways 6 and 7 for the reception of two battery plates 8 and 9.

At the bottom of each of said guideways are blocks or projections 10 and 11 designed to engage the extremities of the bottom edges of the two plates 8 and 9 and support these at some distance above the bottom of the cell compartment. The width of the guideways is preferably just sufficient to permit them to receive and hold the plate for which it is intended, with such clearance as is necessary to take care of variations in manufacture, although if desired and as shown in Figs. 1 and 2, the guideway 7, or both guideways, may have a width equal to the combined thickness of the battery plate 9 and of a wooden, perforated rubber or other insulating separator 12.

It will be noted that the plate supports 11 at the bottom of the guideways 7 are cut away to permit the separator extending all the way down to the level of the inner surface of the bottom 13 of the container and the height of said separator is such that it extends above the top edge of the plate 9 to which it is immediately adjacent.

While in Figs. 1 and 2 I have shown a construction of battery in which the separator 12 is held immediately adjacent and in contact with that face of the plate 9, which is next to the plate 8, I may if desired construct the container with two vertical ribs 14 and 15 at each end of the compartment, as shown in Fig. 4, thus as before providing guideways 6 and 7 for the two plates, although in this case providing also a separate guideway 16 between said ribs, which may be used for the reception of a separator if desired.

In order to permit free access of electrolyte to those faces of the plates which are immediately adjacent the partitions 2 or end walls 17 of the container, I provide vertically extending ribs or projecting portions 18, preferably at the middle of each of these side walls, so that when the plates are mounted in their compartments, there is not only a space between them for a relatively large volume of electrolyte, but there are also provided spaces between the side walls of the compartments and their outer faces to permit of the free access of the electrolyte thereto.

The battery construction illustrated in Figs. 1 to 4 of the drawings is adapted particularly to the "B" battery of a radio receiving set, and in order to simplify the construction to the utmost, I have provided each compartment with but two plates. Each plate has an upwardly projecting lug or strap 19 extending from the middle of its top edge, and the lugs of adjacent compartments belonging to plates of unlike polarity are welded together or otherwise electrically connected.

To inclose the tops of the cells to prevent spilling of the liquid and spray, as well as to minimize the evaporation of the electrolyte, I provide the cover 4 for each of the compartments and this is preferably made of a single body of rubber, or other suitable insulating material, molded in the form of a hollow body portion 20 having around its edge an outwardly projecting marginal flange 21. Said flange is substantially rectangular in outline and is designed to closely fit within any of the compartments of the container so as to rest upon and be supported by the shoulder 3. Said hollow cover body includes a vertically extending tubular portion 22 having a top opening for the reception of a suitably vented plug 23, preferably of soft rubber, designed to be retained therein by friction. The edge flange 21 is provided with two opposite notches to permit passage of the connecting lugs 19 of the plates 8 and 9 and a suitable asphaltum or other sealing compound 24 is introduced into the space between the body of the cover and the adjacent side walls and partitions of the container—the flange 21 preventing downward flow of said compound into the body of the compartment.

Since the connecting straps 19 of the plates are spaced by the ribs or projections 18 away from the adjacent walls of the compartment, the sealing compound is free to flow completely around each of them, thereby making tight joints with them, as well as with the cover and the walls of the compartment, so that the top of the cell is effectively sealed.

While I have devised the above construction particularly for use in a battery employing or including a multi-compartment container and have described a form having but two plates in each compartment as preferred for radio "B" batteries, it is to be understood that without departing from my invention, I may utilize it in the construction of single battery cells, or in cells having more than two plates. Fig. 5 is a plan view of a single five-plate cell container whose opposite end walls are provided with a plurality of vertically-extending ribs 30 forming vertical guideways or retaining recesses for receiving the battery plates and in the case illustrated there are four such ribs for each of the ends of the container. There are thus provided five sets of plate-receiving guideways, each having at its lower end a block or ledge for supporting the lower edge of a plate above the bottom of the container. In the case of the two outside guideways these ledges are formed with slots 31 for the reception of separators and in the case of the middle pair of guideways, there are two of these slots to permit of the use of a pair of separators respectively adjacent both faces of the middle plate. As before, at the center of each of the side walls of the cell there are preferably vertically extending ribs 18 designed to space the adjacent negative plates away from the main face of the wall.

From the above description it will be appreciated that by the use of ribs on the end walls of the cells or compartments of a battery, I am enabled to positively position and immovably hold the several plates in the desired relative positions, it being obvious that the separators may be used or not as desired depending upon the nature of the work for which the battery is designed as well as on its construction. Moreover, the construction illustrated reduces to a minimum the possibility of loose active material collecting in such manner as to bridge across and make electrical connection between adjacent plates and this possibility is still further diminished by reason of the fact that the plates are supported at their ends by isolated projections providing no horizontal surface for the accumulation of active material.

The plates are so mounted in the container that the electrolyte has free access to their outer as well as to their inner faces, and the construction is obviously one of the utmost simplicity and ruggedness. The covers 4 are of such design as to permit of free escape of gases thru the small vent notch or hole provided in or alongside of the plug 23. Said covers are sealed in at a level below the top edges of the walls and partitions of the container so that any acid film on the top of a battery is broken up by the projecting walls and partitions and leakage currents are minimized. The wall projections, furthermore, keep solution from running down the sides of the battery when a cell is accidentally filled too full.

When two or more batteries are placed side by side for use, the bottom projections 25 maintain an air space between their adjacent side walls so that there is little likelihood of acid films forming and leakage currents passing between the batteries.

I claim:

1. The combination of a container having ribs projecting from opposite walls; plates in the container held away from said walls by said ribs; with other ribs projecting from the walls of the container for positively positioning the plates therein.

2. The combination of a container having vertical ribs projecting from opposite side walls; and plates in the container held away from said walls by said ribs, there being vertical guideways in the end walls of the container for receiving the vertical edges of said plates.

3. The combination in a battery of a container having vertical guideways in its walls; substantially parallel plates having their vertical edges extending into said guideways; ledges at the bottoms of the guideways supporting the plates above the bottom of the container; and at least one separator extending down to the bottom of the container between two adjacent plates.

4. The combination in a battery of a container having plate-supporting blocks at the bottom; plates resting on said blocks above the bottom of the container; and at least one separator sheet extending into grooves in the blocks below the bottom of the plates.

5. The combination in a battery of a container; a hollow flanged cover for said container having side notches in its flange; plates in the container having lugs extending out through the notches respectively; with sealing compound around the plate lugs and resting on the flange between the cover and the container.

6. The combination in a battery of a container having an internal, cover-supporting ledge; a cover having a projecting flange resting on said ledge and formed with notches in said flange; plates in the container having lugs extending through said notches respectively; and sealing compound around the plate lugs and between the cover and the container.

7. The combination in a battery of a container formed with opposite plate-receiving guideways; plates in said guideways; ribs projecting from the walls of the container and spacing the outer faces of the plates away from the same; connections from the plates; a cover having notches for the passage of said connections; with sealing compound extending around the connections and between the cover and the adjacent walls of the container.

8. The combination in a battery of a substantially rectangular container having a series of integral transverse partitions forming compartments; plates in each compartment; means for maintaining said plates in spaced relation; and projections on the partitions for spacing the adjacent plates away from the same.

9. The combination in a battery of a container having a series of integral transverse partitions forming compartments and including vertically-extending ribs in said compartments; plates in each compartment maintained in spaced relation by said ribs; projections on the partitions for spacing the adjacent plates away from the same; covers for the compartments respectively; and sealing compound between the covers and the adjacent walls of the compartments.

10. A substantially rectangular battery container having integral vertically-extending ribs projecting inwardly from one pair of opposite walls and adapted to separate the edges of adjacent battery plates; with other ribs projecting inwardly from the other pair of opposite walls adapted to maintain spacing between the main faces of the walls and the faces of the plates.

11. A one-piece multi-compartment container having substantially vertical ribs projecting inwardly from the four sides of each compartment, said ribs being adapted to positively position the plates apart and with their outer faces spaced away from the faces of the container walls.

WALTER E. HOLLAND.